United States Patent [19]

Decker

[11] 4,203,304
[45] May 20, 1980

[54] FLEXIBLE SHAFT COUPLING

[75] Inventor: Herbert Decker, Lauf, Fed. Rep. of Germany

[73] Assignee: Triumph Werke Nurnberg A.G., Nuremberg, Del.X

[21] Appl. No.: 958,686

[22] Filed: Nov. 8, 1978

[30] Foreign Application Priority Data

Nov. 15, 1977 [DE] Fed. Rep. of Germany ....... 2750988

[51] Int. Cl.² .............................................. F16D 3/78
[52] U.S. Cl. ..................................... 64/13; 64/15 R; 64/15 B; 64/11 B
[58] Field of Search .............. 64/11 B, 13, 15 R, 15 B

[56] References Cited

U.S. PATENT DOCUMENTS

| 1,389,915 | 9/1921 | Thomas | 64/13 |
| 1,454,087 | 5/1923 | Thomas | 64/13 |
| 1,682,720 | 8/1928 | Bijur | 64/13 |
| 1,887,538 | 11/1932 | Bond | 64/13 |
| 2,371,507 | 3/1945 | Davis | 64/13 |
| 2,883,839 | 4/1959 | Troeger | 64/13 |
| 2,932,201 | 4/1960 | Sabatini | 64/15 R |
| 3,455,013 | 7/1969 | Rayburn | 64/13 |
| 3,481,158 | 12/1969 | Magerjak | 64/15 B |
| 3,543,537 | 12/1970 | Rothfuss | 64/13 |

FOREIGN PATENT DOCUMENTS 668217 11/1938 Fed. Rep. of Germany ............. 64/13
383912 8/1973 U.S.S.R. ................................. 64/11 B Primary Examiner—Charles J. Myhre
Assistant Examiner—R. C. Turner
Attorney, Agent, or Firm—Joseph R. Spalla

[57] ABSTRACT

A flexible shaft coupling for connecting a drive and a driven shaft comprises an axially stacked plurality of flexible metal discs which are connected to one another at oppositely spaced peripheral points with the directly connection between one disc and its neighboring disc on one side being displaced 90° from the interconnection with the neighboring disc on its other side. The coupling is particularly suited to transmit torque yet allow movement of the driven shaft axis relative to the drive shaft axis. The invention has particular application to small precision mechanisms such as a single element typewriter wherein the single element typehead, secured to the driven shaft, must be capable of being rotated and tilted to position a desired character opposite a printing point.

3 Claims, 4 Drawing Figures

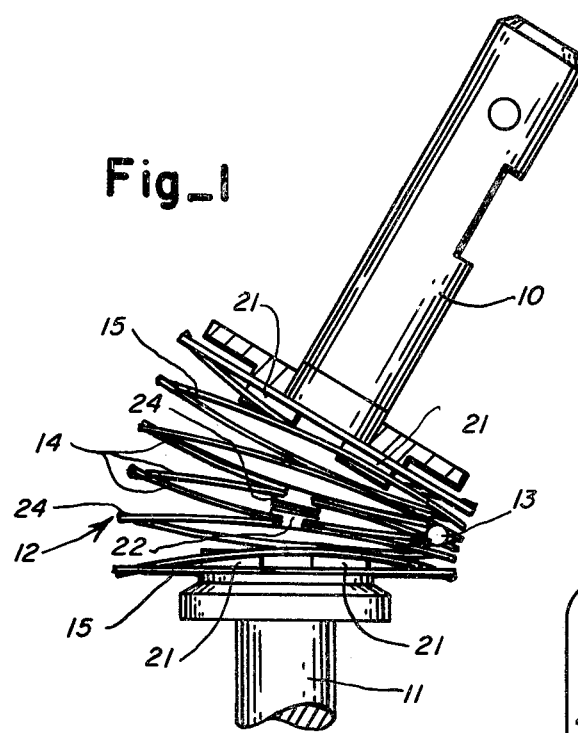
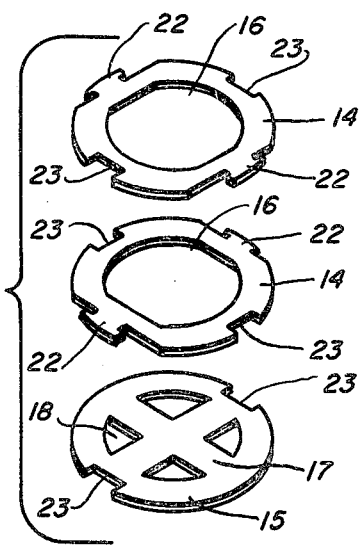
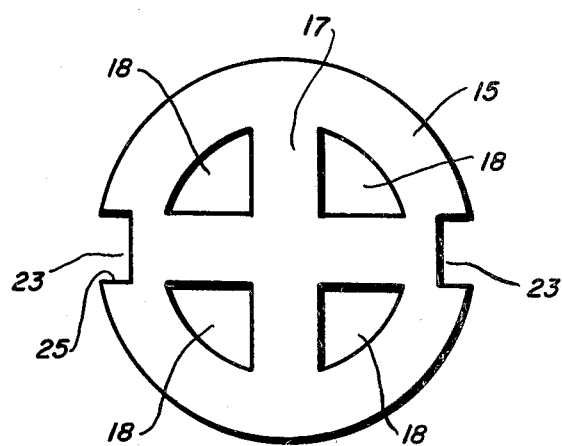
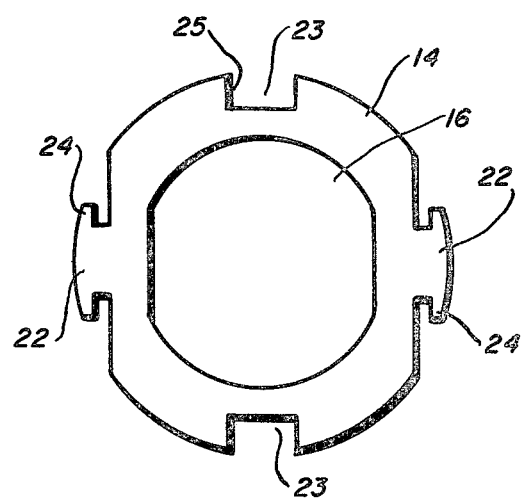

FLEXIBLE SHAFT COUPLING

This invention relates to flexible couplings; more particularly, it relates to flexible couplings in the form of an axially stacked plurality of interconnected discs; and specifically, to a flexible coupling wherein the interconnections between neighboring discs are at opposite peripheral points with the interconnection of one disc with the neighboring disc on one side being displaced 90° from its interconnection with the neighboring disc on the other side.

Flexible couplings for shafts taking the form of axially stacked interconnected discs are known, for example, from French Pat. No. 616,929 and from German Pat. Nos. 851,285 and 1,286,813. These couplings have the drawback that they cannot be used in small precision applications due to the fact that the torque transmitting discs are connected to each other at both their outer and inner edges by welding, riveting or other similar methods with the result that they do not lend themselves to small precision applications.

In accordance with the invention, the drawbacks of the prior art are overcome in a system of interconnection of an axially stacked series of flexible discs wherein all interconnections are at the periphery of the disc. More particularly, each disc is directly connected to its neighboring disc at opposite peripheral points with the interconnections of one disc to neighboring discs on either side being displaced 90°.

An object of the invention is to provide a flexible shaft coupling which can be easily produced for use in precision applications having diameters on the order of a few millimeters which are stable enough to transmit play-free torque while allowing off-axis movement of the driven shaft.

Another object of the invention is in the provision of a flexible shaft coupling taking the form of an axially stacked series of flexible discs which are soley peripherally interconnected.

Other objects and many of the attendant advantages of this invention will be readily appreciated as the same becomes better understood by reference to the following detailed description when considered in connection with the accompanying drawing in which like reference numerals designate like parts throughout the Figures thereof and wherein:

FIG. 1 is an elevational view of a flexible coupling between a drive shaft and a driven shaft in accordance with the invention;

FIG. 2 is a view of an end disc of the coupling;

FIG. 3 is a view of an intermediate disc of the coupling; and

FIG. 4 is a perspective view illustrating the interconnection of neighboring discs.

Referring now to the drawing wherein like reference numerals designate like or corresponding parts throughout the several views, there is shown in FIG. 1, which illustrates a preferred embodiment, a driven shaft 10 and a drive shaft 11 which are coupled to one another by means of a torque transmitting flexible coupling generally designated by reference numeral 12 which permits angular positioning of the shafts 10 and 11 and off-axis movement of the shafts relative to one another about a pivot point 13. The shafts 10 and 11 can be mounted to this end in fork-shaped end pieces (not shown) connected through pivot point 13 as is disclosed in U.S. Pat. No. 3,825,102 issued to Herbert Decker July 23, 1974.

The flexible coupling 12 comprises an axially stacked series of flexible metal intermediate discs 14 and end discs 15. As shown in FIGS. 2 and 4, the end discs 15, defining the top and bottom of the coupling 12, differ from the intermediate discs 14 in that the intermediate discs 14 have a substantially round recess 16 while the end discs 15 are cut out to define a cross-shaped web 17 forming four receptacles 18 designed for receiving projections 21 on the driven shaft 11 and the driven shaft 10. This insures the entrainment of the top and bottom end discs 15 of the coupling by the shafts 10 and 11.

With reference to FIG. 3, all of the intermediate discs 14 are provided with opposite T-shaped tongues 22 and opposite recesses 23 with tongues 22 being displaced 90° from the recesses 23 in each disc 14. Referring to FIG. 2, the end discs 15 are provided with oppositely spaced recesses 23 as shown or alternatively with T-shaped tongues 22. The T-shaped tongues 22 of the intermediate discs 14 are designed to be locked into the recesses 23 of a neighboring end or intermediate disc so that the ends 24 of the top bar of the T-shaped tongues 22 are positioned under the lateral edges 25 of the recesses 23. In this way, as shown in FIGS. 1 and 4, the discs 14 and 15 are non-rotatively connected with each other and experience a slight bowing when connected. As shown in FIG. 4, the T-shaped tongues 22 on each disc are very easily connected to the recesses of a neighboring disc until the required number of discs 14 are interconnected without the necessity of screws, rivets or other parts to provide a connection which is practically without angular play. It is to be noted from FIG. 1 that the system of interconnection results in a substantially cylindrical coupling 12 which can be used in the small precision applications such as in a single element typewriter such as disclosed in the above-noted U.S. patent to Decker. Depending on the material and thickness of the discs 14 and 15, the flexibility of the coupling 12 can be controlled. In that the system of interconnection slightly bows the discs when the assembled discs are mounted on the drive shaft 11 and the driven shaft 10, the spring action of the receptacles 18 in the end discs 15 will cause the projections 21 received within the receptacles 18 to be gripped by the end discs 15 and securely join the assembled coupling 12 to the drive 11 and driven 10 shafts.

The invention claimed is:

1. For use in small precision applications a flexible coupling between a drive shaft and a driven shaft for transmitting torque from said drive shaft to said driven shaft while allowing a change in the axial orientation of said driven shaft relative to the axis of said drive shaft,
    said flexible coupling comprising an axially stacked series of interconnected flexible discs, the interconnection between adjacent discs being at oppositely spaced peripheral points with the interconnection of one disc to a neighboring disc on one side being displaced 90° from its interconnection with a neighboring disc on its other side
    said interconnections comprising interfitting peripheral formations on said discs directly interlockingly connecting said discs to one another.
    and central formations on said first and last discs in the series for connection to said drive shaft and driven shaft, respectively.

2. A flexible coupling as recited in claim 1, said first and last disc in the series being centrally connected to said drive shaft and driven shafts, respectively.

3. A flexible coupling as recited in Claim 1, said disc formations comprising oppositely located tongues and oppositely located grooves displaced 90° from said tongues.

* * * * *